United States Patent
Kawashima

(10) Patent No.: US 7,493,378 B2
(45) Date of Patent: Feb. 17, 2009

(54) NETWORK MANAGEMENT METHOD FOR PROVIDING DEVICE LIST AND NETWORK MANAGEMENT DEVICE TO PROVIDE DEVICE LIST

(75) Inventor: Masanori Kawashima, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 09/817,300

(22) Filed: Mar. 27, 2001

(65) Prior Publication Data

US 2001/0034852 A1    Oct. 25, 2001

(30) Foreign Application Priority Data

Mar. 28, 2000   (JP) ............................. 2000-089655

(51) Int. Cl.
  G06F 15/173   (2006.01)
  G06F 15/16    (2006.01)
(52) U.S. Cl. .................. 709/223; 709/203; 709/224
(58) Field of Classification Search ................ 709/207, 709/220–224, 228, 229, 203
  See application file for complete search history.

(56) References Cited

U.S. PATENT DOCUMENTS

| | | | |
|---|---|---|---|
| 6,246,669 B1 * | 6/2001 | Chevalier et al. | 370/238 |
| 6,289,378 B1 * | 9/2001 | Meyer et al. | 709/223 |
| 6,308,205 B1 * | 10/2001 | Carcerano et al. | 709/221 |
| 6,337,745 B1 * | 1/2002 | Aiello et al. | 358/1.15 |
| 6,421,716 B1 * | 7/2002 | Eldridge et al. | 709/219 |
| 6,631,010 B1 * | 10/2003 | Foster et al. | 358/1.15 |
| 7,072,067 B2 * | 7/2006 | Leiman et al. | 358/1.15 |
| 7,079,166 B1 * | 7/2006 | Hong | 715/777 |

* cited by examiner

*Primary Examiner*—Ario Etienne
*Assistant Examiner*—Hussein Elchanti
(74) *Attorney, Agent, or Firm*—Fitzpatrick, Cella, Harper & Scinto

(57) ABSTRACT

A network managing method provides a device list with which device information with regard to a plurality of devices is arranged in order and displayed for every device. A type of at least one device information to be displayed in the device list is designated from among a plurality of types of predetermined device information capable of being displayed in the device list. A type of the device information to be used as display criteria is also designated in the case where a plurality of devices are arranged in order in the device list. The device information of the type designated as the display criteria is controlled to be displayed in the device list even if the designated display criteria is not included in the type of information designated for display in the list.

31 Claims, 11 Drawing Sheets

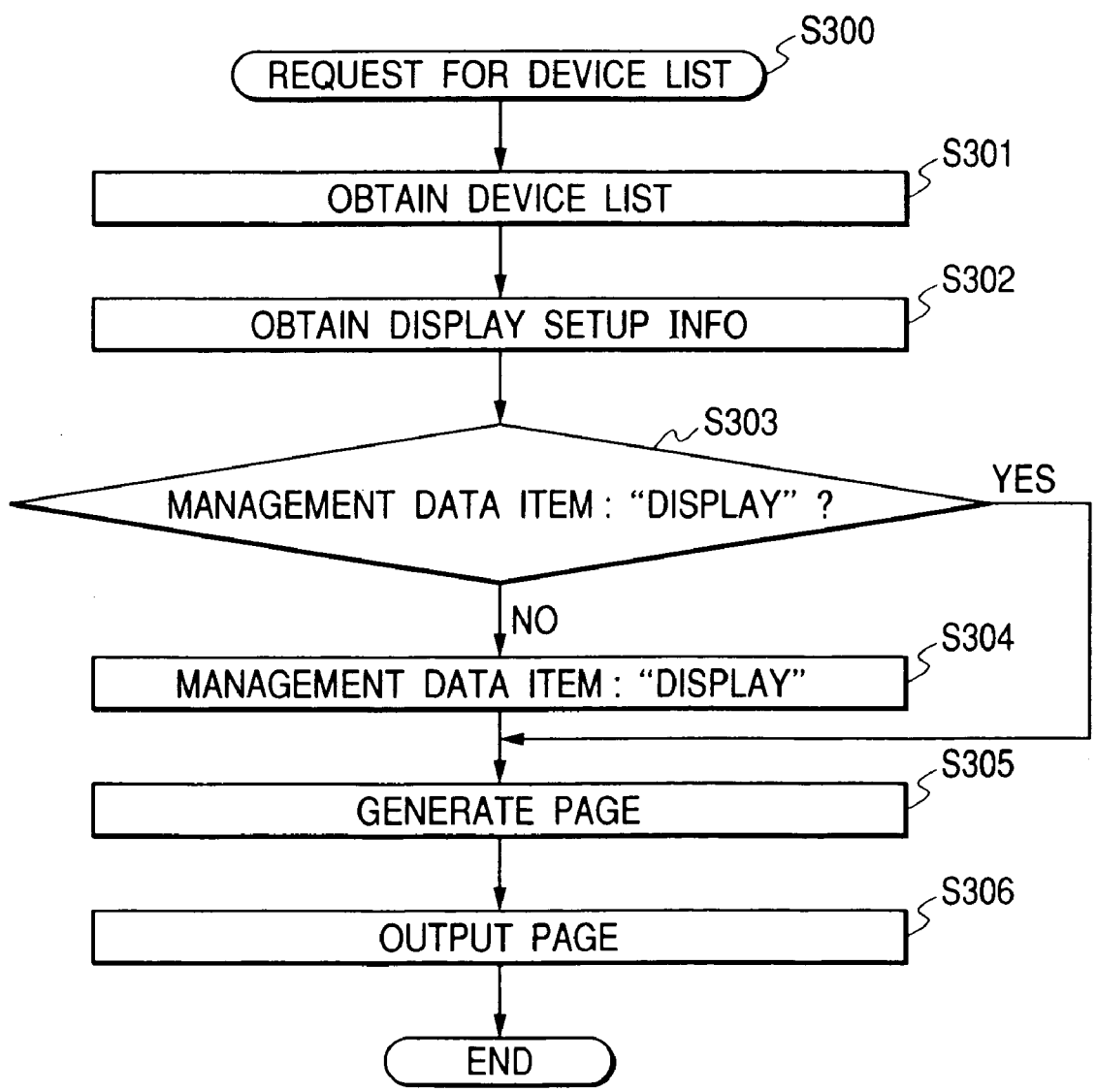

FIG. 4

| DEVICE NAME | PRODUCT NAME | NETWORK INTERFACE BOARD NAME | LOCATION | IP ADDRESS | MAC ADDRESS |
|---|---|---|---|---|---|
| DEVICE A | MODEL X | MODEL* | ROOM* | 192.168.16.* | 0000850E000* |
| DEVICE B | MODEL X | MODEL* | ROOM* | 192.168.16.* | 0000850E000* |
| DEVICE C | MODEL X | MODEL* | ROOM* | 192.168.16.* | 0000850E000* |
| DEVICE D | MODEL X | MODEL* | ROOM* | 192.168.16.* | 0000850E000* |
| DEVICE E | MODEL X | MODEL* | ROOM* | 192.168.16.* | 0000850E000* |
| DEVICE F | MODEL X | MODEL* | ROOM* | 192.168.16.* | 0000850E000* |
| DEVICE G | MODEL X | MODEL* | ROOM* | 192.168.16.* | 0000850E000* |
| DEVICE H | MODEL Y | MODEL* | ROOM* | 192.168.16.* | 0000850E000* |
| DEVICE I | MODEL Y | MODEL* | ROOM* | 192.168.16.* | 0000850E000* |
| DEVICE J | MODEL Y | MODEL* | ROOM* | 192.168.16.* | 0000850E000* |
| DEVICE K | MODEL Z | MODEL* | ROOM* | 192.168.16.* | 0000850E000* |
| DEVICE L | MODEL Z | MODEL* | ROOM* | 192.168.16.* | 0000850E000* |
| DEVICE M | MODEL Z | MODEL* | ROOM* | 192.168.16.* | 0000850E000* |
| DEVICE N | MODEL Z | MODEL* | ROOM* | 192.168.16.* | 0000850E000* |
| DEVICE O | MODEL Z | MODEL* | ROOM* | 192.168.16.* | 0000850E000* |
| DEVICE P | MODEL Z | MODEL* | ROOM* | 192.168.16.* | 0000850E000* |
| DEVICE Q | MODEL Z | MODEL* | ROOM* | 192.168.16.* | 0000850E000* |
| 41 | 46 | 42 | 43 | 44 | 45 |

FIG. 9

| DEVICE NAME | NETWORK INTERFACE BOARD NAME | LOCATION | IP ADDRESS | MAC ADDRESS |
|---|---|---|---|---|
| DEVICE A | MODEL* | ROOM* | 192.168.16.* | 0000850E000* |
| DEVICE B | MODEL* | ROOM* | 192.168.16.* | 0000850E000* |
| DEVICE C | MODEL* | ROOM* | 192.168.16.* | 0000850E000* |
| DEVICE D | MODEL* | ROOM* | 192.168.16.* | 0000850E000* |
| DEVICE E | MODEL* | ROOM* | 192.168.16.* | 0000850E000* |
| DEVICE F | MODEL* | ROOM* | 192.168.16.* | 0000850E000* |
| DEVICE G | MODEL* | ROOM* | 192.168.16.* | 0000850E000* |
| DEVICE H | MODEL* | ROOM* | 192.168.16.* | 0000850E000* |
| DEVICE I | MODEL* | ROOM* | 192.168.16.* | 0000850E000* |
| DEVICE J | MODEL* | ROOM* | 192.168.16.* | 0000850E000* |
| DEVICE K | MODEL* | ROOM* | 192.168.16.* | 0000850E000* |
| DEVICE L | MODEL* | ROOM* | 192.168.16.* | 0000850E000* |
| DEVICE M | MODEL* | ROOM* | 192.168.16.* | 0000850E000* |
| DEVICE N | MODEL* | ROOM* | 192.168.16.* | 0000850E000* |
| DEVICE O | MODEL* | ROOM* | 192.168.16.* | 0000850E000* |
| DEVICE P | MODEL* | ROOM* | 192.168.16.* | 0000850E000* |
| DEVICE Q | MODEL* | ROOM* | 192.168.16.* | 0000850E000* |
| 91 | 92 | 93 | 94 | 95 |

NETWORK MANAGEMENT METHOD FOR PROVIDING DEVICE LIST AND NETWORK MANAGEMENT DEVICE TO PROVIDE DEVICE LIST

BACKGROUND OF THE INVENTION

1. Field of the Invention

The present invention relates to a network management method that a management data about a plurality of devices provides a device list arranged in order and displayed for every device in management of a network device, a network management device providing the device list and a program to provide the device list.

2. Related Background Art

Computers can be interconnected via local area network (LAN). A Local Area Network may be interconnected to incorporate systems covering one floor of a building or a whole building, a building group (premises), region or bigger area. Some of the greatest examples reach international system. Each LAN may be equipped with various hardware interconnection technology and many network protocols.

Simple LAN separated from others can be managed by an individual user. This means that a user can exchange a device, install software or diagnose problems.

On the other hand, complicated LAN of large-scale and interconnected big LAN groups need "management". Generally "management" means both management by human network device manager and management by the software that managers employ. In this application specification, "management" means management by software to manage a whole system, and "users" mean persons employing network device management software. The users in this case are usually system administrators. Users get management data on network by using network device management software, and can change the data.

Large-scale network system is generally a dynamic system that needs to perform continuous extension of devices and removal, updating of software and detection of problems and so on. Generally there can be various systems that are owned by various people, and are supplied by various manufacturers.

Description on one example of conventional large-scale network in need of management will be done as follows.

FIG. 6 is a diagram showing an example that network board (NB)101 for a printer to be connected to network is connected to printer 102 comprising open type architecture. NB101 is connected to Local Area Network (LAN)100 over Ethernet interface 10 Base-2 comprising coaxial connector and LAN interface of 10 Base-T comprising RJ-45.

A plurality of personal computers PC 103, PC 104 (PC) etc. illustrated is also connected to LAN 100 and these PCs can communicate with NB101 under control of network operating system. Therefore, one of PCs, for example, PC 103 may be used for the purpose of network device management. In addition, a local printer such as for example printer 105 connected with PC 104 may be connected to each PC.

File server 106 is connected to LAN 100 and this file server 106 manages access to files stored in network disk 107 of large capacity (for example, 10 billion bytes).

Print server 108 orders printing to plural printers 109 connected or a printer of the 105 etc. in a remote place. In addition, other various peripheral devices (not illustrated) may be connected to LAN 100.

WWW server 150 is also connected to LAN 100. HTML documents generated by means of network device management software installed in WWW server 150 are displayed in WWW browser installed in PC 103, and printer setup made in WWW browser on PC 103 is transmitted to specific printers through the network device management software on WWW server 150.

Network shown in FIG. 6 in more detail may employ various network software such as software of Novell Inc. or software of UNIX in order to communicate efficiently among various network members. Although it is also possible to use any network software, the NetWare (registered trademark of Novell Inc., and is notation abbreviation hereinafter) software of Novell Inc., for example, may be used. Detailed description with regard to this software package is described by on-line documentation bundled with NetWare packages. This documentation can be purchased along with NetWare packages from Novell Inc.

Briefly, a file server 106 will play a role of the file management section that performs reception of files, storage, queuing, cache operation, and transmission between LAN members. For example, data files generated by each of PC 103 and PC 104 is sent to file server 106 and the file server 106 sets these data files in sequence. Subsequently the arranged data files are transmitted to one of printers 109 according to command from print server 108.

PC 103 and PC 104 comprise general PC. This PC may perform generating of data files, sending of generated data files to LAN 100, and receiving of files from LAN 100, and moreover may display and/or process these files. Although personal computer (PC) is shown in FIG. 6 as computer equipment, other computer equipment may be included that seem to be appropriate to carry out network software. For example, UNIX workstation may be included in network when UNIX software is employed. These workstations (WS) can be used with PC currently illustrated under a suitable situation.

Usually, LAN as LAN 100 services to comparatively local users group of a one floor in one building or users group in a sequence of a plurality of number floors.

For example, in the case where a certain user is separated from other users, that is, for example, a user is in other buildings or in other prefectures, Wide Area Network (WAN) may also be built. Basically WAN is an aggregate formed by some LANs being connected in high-speed digital network of Integrated Services Digital Network (ISDN). Therefore, as is shown in FIG. 6, LAN 100, LAN 110 and LAN 120 are interconnected together through modems/transponders 130*a*, 130*b* and backbone 140 resulting in formation of WAN 600.

Each LAN may include exclusive PC and there may be file servers and print servers if needed. For example, as shown in FIG. 6, LAN 110 includes PC 111, PC 112, a file server 113, a network disk 114, a print server 115 and a printer 116. Contrastively, LAN 120 includes only PC 121 and PC 122. LAN 100, LAN 110, and equipment connected to LAN 120 can access the function of equipment connected to other LAN.

Some trials and methods to manage device on such network to compose large-scale network system are performed in many standard organizations until now. The International Organization for Standardization (ISO) has provided a general-purpose base framework as referred to as Open System Interconnection (OSI) model between open type systems. OSI model of network device management protocol is referred to as Common Management Information Protocol (CMIP). CMIP is European common network device management protocol.

In addition, in recent years there is a giant protocols with relation to CMIP as referred to as Simple Network Management Protocol (SNMP) as a network device management protocol with higher commonality. ("THE SIMPLE BOOK An Introduction to Management of TCP/IP-based Internets" by Marshall T. Rose. Japanese translation by Takeshi Nishida, published by TOPPAN Printing C., Ltd. An Aug. 20, 1992 first edition.)

According to this SNMP network device management technique, at least one network device management station (NMS), management target nodes that each include agents and network device management protocol employed so that management station and agents exchange administrative information are included in network device management system. By communicating with agent software on nodes for management using network device management software on NMS, users can obtain the data on network and can change the data.

Here, agent means software that runs as background process on each target equipment. When a user demands a management data from the equipment on networks, management software will put object identification information into management packets or frames, and will send them out to target agent. The agent interprets this object identification information, takes out the data corresponding to this object identification information and puts the taken-out data into packets and returns them to the user. Occasionally, a corresponding process may be called in order to take out the data.

In addition, agents store management data with regard to the status in the form of a database. This Data Base is referred to as MIB (Management Information Base). MIB has data structure of tree structure and all nodes are uniquely numbered. This identification data of the node is referred to as object identification data (Object Identifier).

This structure of MIB is referred to as Structure of Management Information (SMI) and is prescribed by RFC 1155 Structure and Identification of management Information for TCP/IP-based Internets by IETF (Internet Engineering Task Force).

In addition, in this application specification, a management data of network device and information assigned to object identification data of MIB (MIB information) have an equivalent meaning.

SNMP protocol will be briefly described next. PC (henceforth manager) with which network device management utility software is operating, and the network device for management (henceforth agent) to which the SNMP agent is operating communicates each other using SNMP protocols. SNMP protocols have five commands, and each is referred to as Get-request, Get-next-request, Get-response, Set-request, Trap respectively.

Get-request and Get-next-request are commands sent out from a manager to an agent, in order that a manager may obtain the value (MIB information) of an agent's MIB object. The agent that received this Get-request and Get-next-request command sends out Get-response command to manager in order to notify the manager of values of MIB object.

Set-request command is a command sent out to agent by manager so that the manager sets up values of MIB object of the agent. The agent that received this command sends out Get-response command to the manager in order to notify the manager of the setup result.

Trap command is a command sent out to the manager by the agent so that the agent notifies of change of own status to the manager.

An SNMP agent works on each PC and network board (NB)101 connected with printer 102. As for the network device management software to work as an SNMP manager, systems working on PC are known well. However, as in recent years internet spreads, exclusive network device management software does not work on each client PC, but systems are proposed where network device management software works on servers, and, in addition, WWW (World Wide Web) is used as user interface.

FIG. 7 is referred to next, and brief description on operation of general WWW system and operation on SNMP control program based on WWW system will be described.

WWW server program 1051 works in PC 150, and a lot of WWW page data described by means of HTML (WWW document itself or templates to generate WWW document) are stored in discs (not illustrated) of PC 150.

WWW browser program 1031 working on PC 103 requires acquisition of specified pages to WWW server program 1051 working on PC 160 in order to display a page specified by users.

WWW server program 1051 returns specified page data as response to the request from the WWW browser program 1031. WWW browser program 1031 analyzes obtained page data and the page is displayed according to the description.

In the case where request via CGI (Common Gateway Interface) is included in page acquisition request from WWW browser program 1031, WWW server program 1051 starts external script and program by the CGI predetermined method, subsequently receives page data to reply to request from WWW browser program 1031 and returns the received page data to WWW browser program 1031. In addition, external script and program started by CGI generate page data depending on request from WWW browser program 1031.

Description on the case that the external program started by CGI is corresponding to the network device management software of technical field of the present application will be given next.

The network device management program 1052 started by the WWW server program 1051 using CGI obtains a management data from device connected to networks using SNMP, for example, a printer 102. Network device management program 1052 generates pages described by HTML based on obtained management data (henceforth HTML document) and returns them to WWW server program 1051. Information with regard to the printer based on management data is shown in this page described by HTML for each a plurality of printers searched for by networks.

SUMMARY OF THE INVENTION

Display example of the HTML document that network device management program 1052 generated is shown in FIG. 8. FIG. 8 shows display an example of page for setup of display of a device list. FIG. 10 also shows an example of a display of a device list that indicates management target devices connected to the network by list.

In an example of FIG. 10, management data (MIB information) such as device name, product name, network interface board name, location of installation, network address, MAC (media access control) address is obtained from each network device connected to network and is displayed. The management data currently displayed here is only an example and status etc. may be displayed according to the purpose of a network device management system.

In addition, a management data item represents a type of management data and here it represents device name, product name, network interface board name, location of installation, network address and MAC address.

As a method for making a list of management target device connected to networks, it is conceivable a method that a user of network device management system registers an IP address of devices. And also a method may be possible that the Get-request packet for obtaining the above described specific management data is transmitted by broadcasting or by multicasting to the network where the network device management system is connected, and that a list is made of the device which returned right management data as answering to this packet according to directions of Get-response packet. FIG. 11 shows display example of the details of device to display the information showing details about device selected by a user among devices displayed by device list of FIG. 10. In display example of these details, network device management software obtains and displays status of network device (a printer), an installation situation of options and status of paper feeding division as MIB information.

Now in FIG. 10 the setting up of a method to list device list here may be done according to the display example of device list display setup page shown in FIG. 8.

In an example of FIG. 8, management data item 81 that is a sort key used for sorting the device list may be specified, and management data item 82 displayed by the device list may be checked and specified. In other words when check box of 82 is checked by a user, a management data item in the device list needed to be displayed can be selected. In addition, according to the selection of radio button of 83 by a user criteria may be selected on which the device currently displayed of the device list is sorted.

When a user looks for a specific device from device list, sort function becomes valid. Since only a required management data is displayed by it, a display/non-display function of a management data is effective function that improve the readability of the device list.

However, when there is no associated relationship between the setup of a management data item to show device list and the setup of the management data item used to be sort key of the device list, there occurs a problem that the information of what kind of sequence device list is sorted by will be lost, in the case where the non-displayed management data item is set up as sort key by a user.

For example, a certain user wants to sort devices based on a product name to look for device having a specific product name from device list and he selects "product name" as the data item that is sort key with 81 of FIG. 8. In this occasion when, in 82 of FIG. 8, "product name" is not selected as the management data item that should be displayed, a situation occurs that product name of each device is not displayed even if device in device list is sorted by a product name and is arranged. Therefore the user cannot look for device having a desired product name.

Thus there is a purpose of the present invention of this application in providing network device management method in computer network that can solve the above described problem and network device management device to execute the method concerned and storage medium storing the program of the method concerned.

BRIEF DESCRIPTION OF THE DRAWINGS

FIG. 3 is a flow chart showing an embodiment of a processing displaying a device list in the program of the network device management method according to the present invention;

FIG. 4 is a chart to show a display example of the device list generated by program of a network device management method according to the present invention;

FIG. 9 is an illustration to show display an example of the device list generated by conventional network device management software;

DESCRIPTION OF THE PREFERRED EMBODIMENTS

Figure 1:
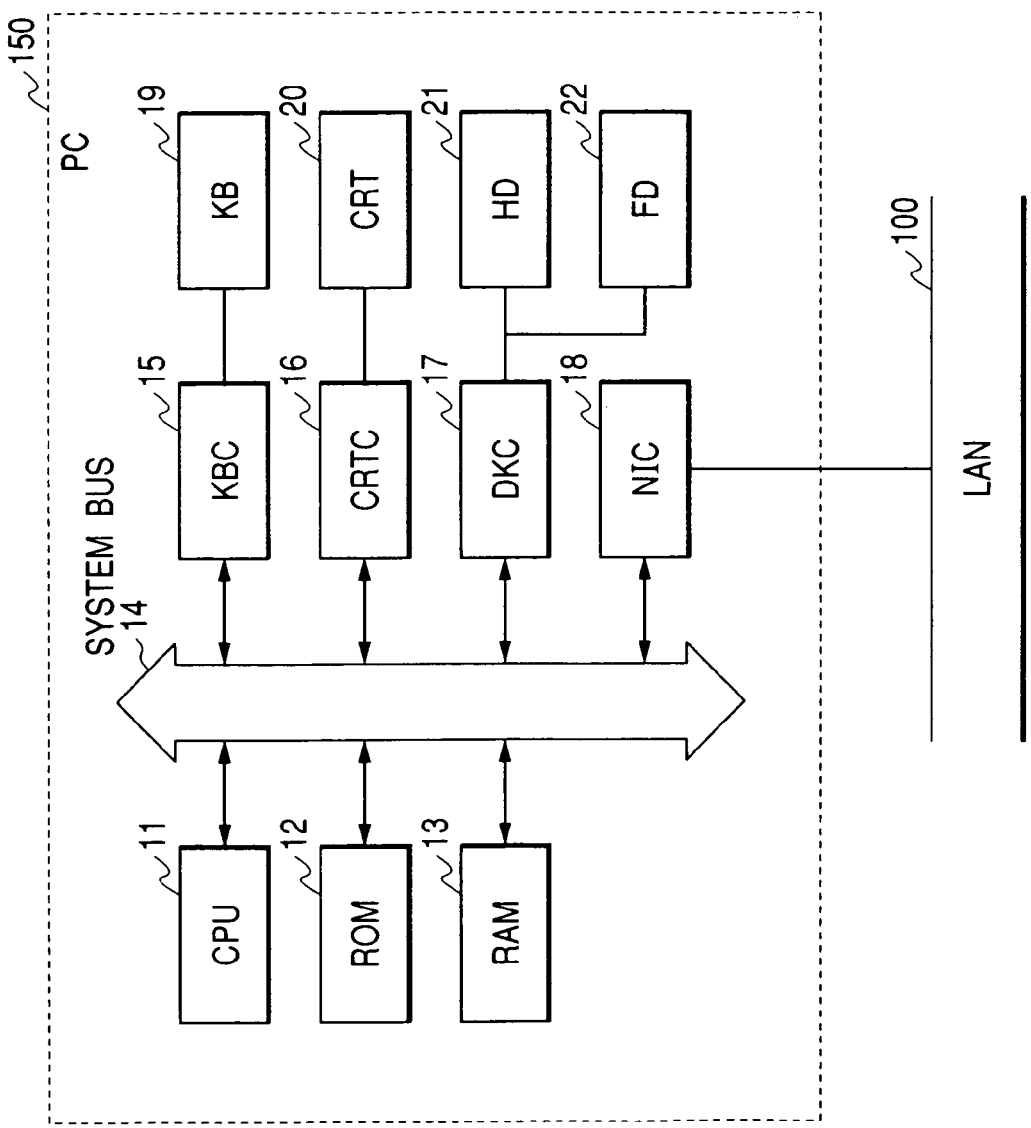
FIG. 1 is a block diagram showing a configuration of PC in which a program of a network device management method according to the present invention is operable.

Hereafter, with reference to the drawing, one embodiment, of a network device management method concerning the present invention, of a network device management equipment for enforcing the method concerned, and of a storage medium storing programs of method concerned will be explained.

A network device management method, equipment and storage medium related to the present invention may be realized with PC of configuration the same as PC which can realize conventional network device management device as shown in FIG. 1.

In FIG. 1, 150 shows PC with which network device control software (it is a program of a network device management method, and is hereafter described as network device management software) works.

CPU 11 of PC 150 carries out a network device management software stored in ROM 12 or hard disc (HD) 21 or network device management software supplied from floppy disk (FD) 22, and controls each device connected to system bus 14 in the gross.

RAM 13 works as main memory and work area of CPU 11. Keyboard controller (KBC) is represented by 15 that controls input instructions from various input devices such as keyboard (KB) 19 or pointing device (it is not shown). CRT controller (CR TC) is represented by 16 that controls display of various display of CRT display (CRT) 20.

Disc controller (DKC) 17 controls access to hard disc (HD) 21 and floppy disk (FD) 22. In hard disc (HD) 21, boot programs, various kinds of applications, editing files, user files and network device management software are stored. User files etc. are memorized in floppy disk (FD) 22. Network interface card (NIC) is represented by 18 and exchanges data with agents or network equipment bidirectionally via LAN 100.

In addition, in all the below described explanation, as long as there is no notice especially, the subject of hardware of execution is CPU 11, and the subject of software is the network device management software installed in the hard disk (HD) 21.

Figure 6:
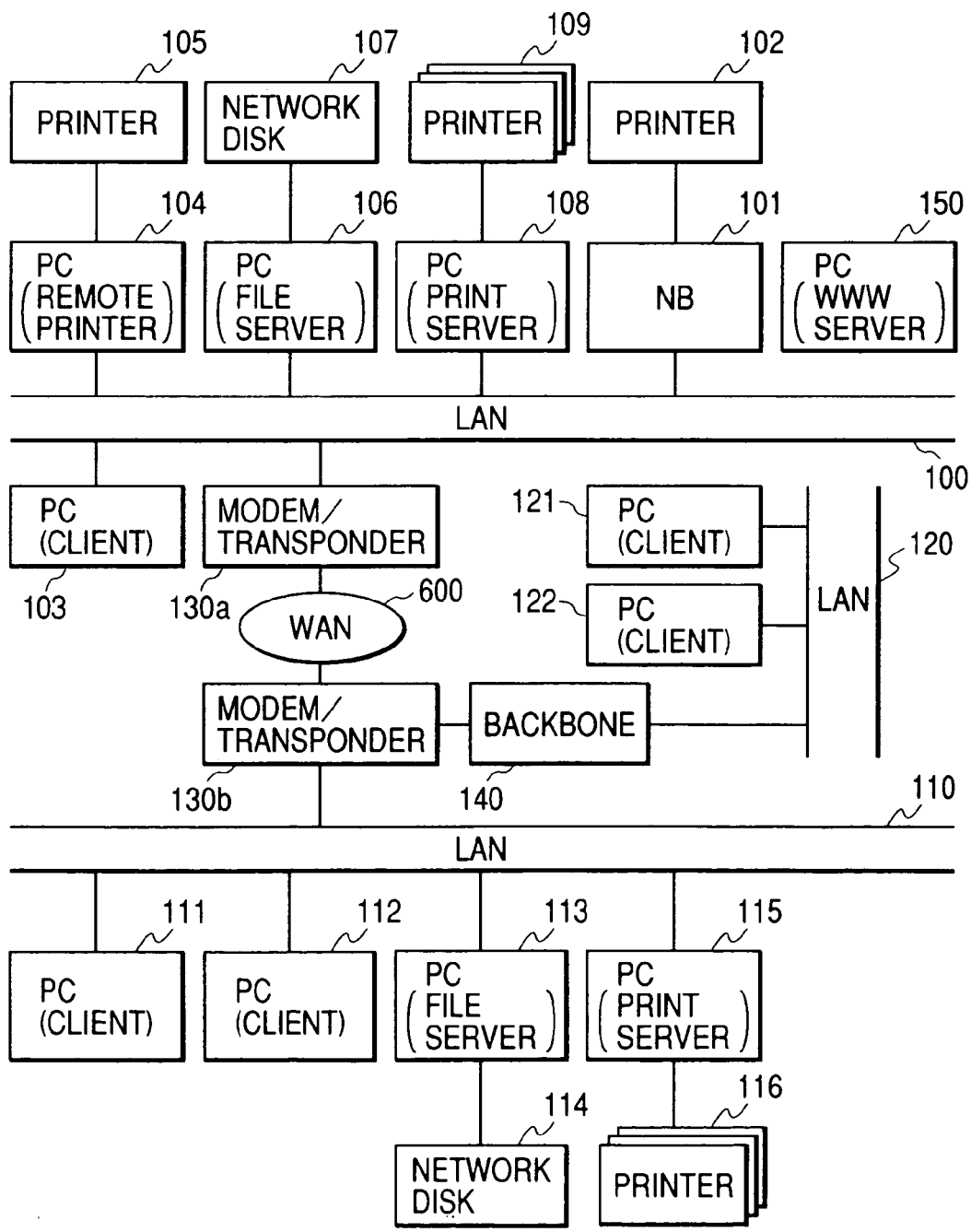
FIG. 6 is a block diagram showing an example of a conventional technology in which a network board for connecting a printer to networks is connected to a printer equipped with an open-type architecture.
Figure 7:
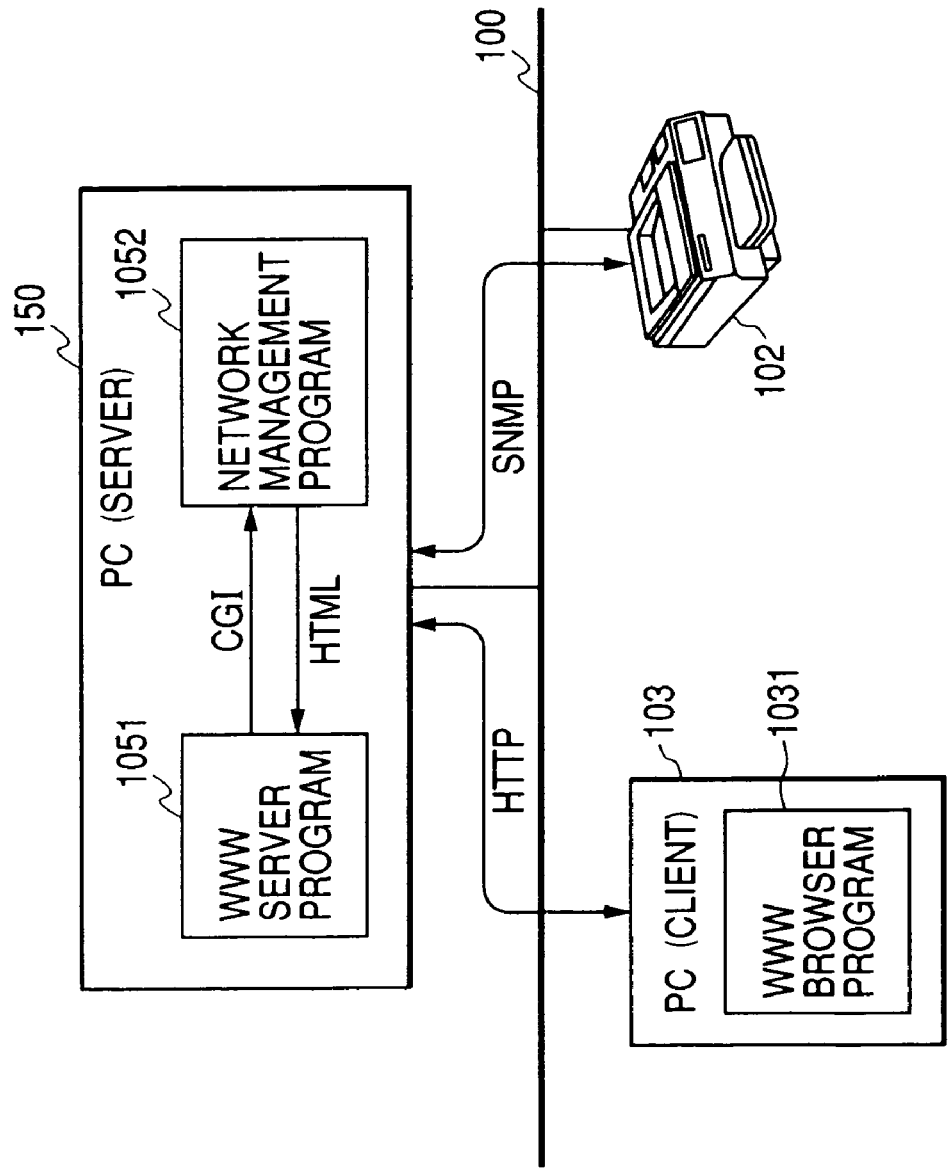
FIG. 7 is a configuration chart explaining a brief description of an operation of a conventional general WWW system and of an operation of SNMP control program on the basis of WWW system.

In addition, for example, in FIG. 6 showing a network configuration, a combination such as, for example, of network board (NB)101 connected to networks and printer 102 that NB101 is mounted with are referred to as network device.

Figure 2:
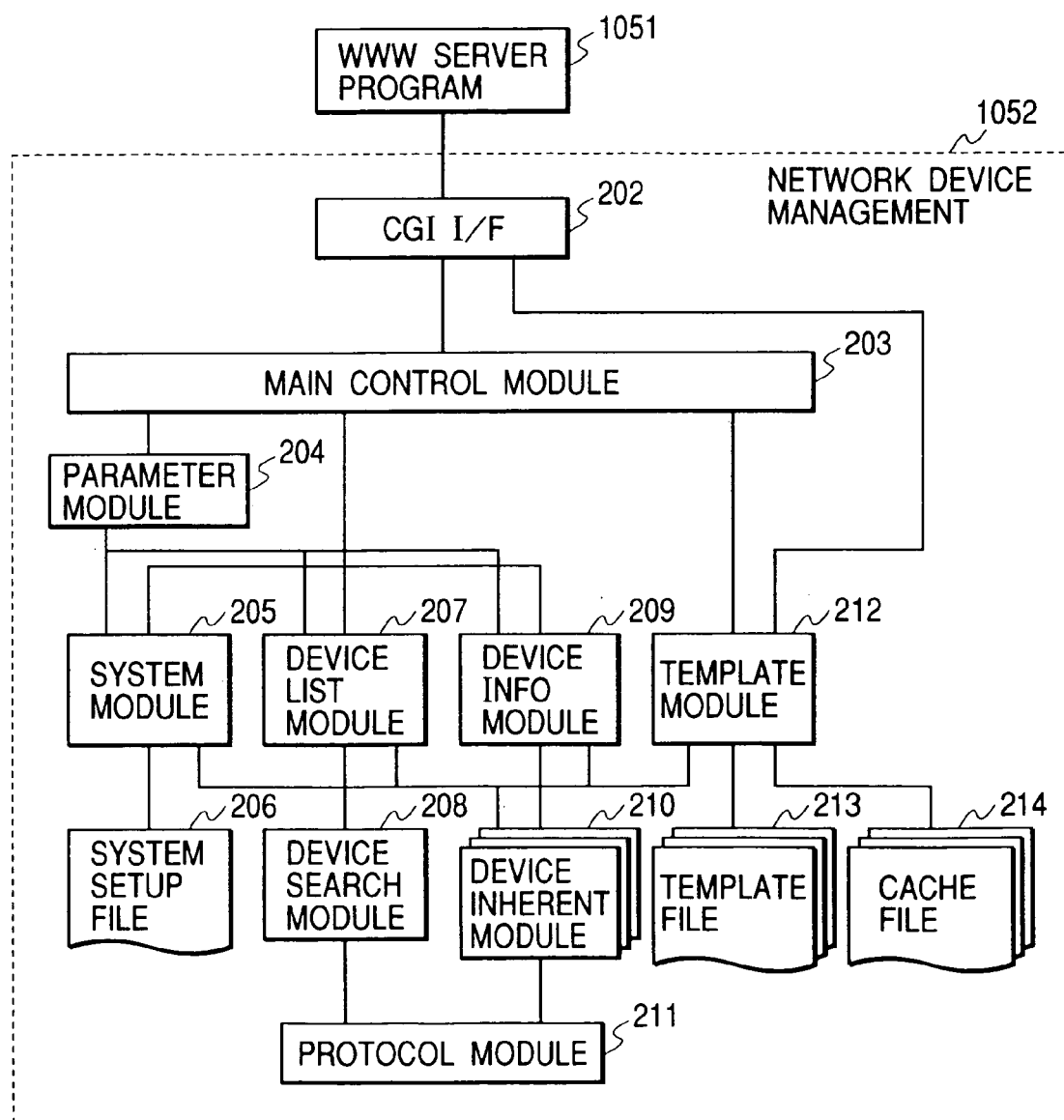
FIG. 2 is a module configuration chart of a program (network device management software) of a network device management method according to the present invention.

FIG. 2 shows a figure of configuration of module of network device management software related to the present invention.

Network device management software 1052 related to the present invention is stored in the hard disc (HD) 21 in FIG. 1 and is executed by CPU 11. On that occasion CPU 11 employs RAM 13 as work area.

In FIG. 2, network device management software 1052 is started by WWW server program 1051 and exchanges CGI parameters and HTML documents over CGI interface 202.

A main control module is represented by 203. After the main control module 203 registers a CGI parameter to parameter module 204 described below, it distributes control to after-mentioned either of system module 205, device list module 207 or device information module 209 depending on a command parameter in the CGI parameter. In the case where the CGI parameter includes errors, an HTML document that there are errors in the CGI parameter may be generated over after-mentioned template module 212.

Parameter module 204 stores and/or manages a CGI parameter registered by main control module 203 in a form of table. Other modules can obtain desired parameters from parameter module 202 if required.

A system module 205 controls display and/or setup of the system parameters (for example, automatic update interval of HTML documents etc.) that specify an operation of the network device management software 1052, and generates a related HTML document.

System module 205 obtains a command parameter from parameter module 204, and when contents of an obtained command parameter are display request of system parameters, necessary information is read from system setup file 206, and HTML documents for system parameters display is generated over template module 212. In addition, when the content of obtained command parameters is setup request of system parameters, system parameters reported are written in system setup file 206, and the HTML document that should be displayed after setting is generated via template module 212.

In addition, although not shown in FIG. 2, system parameters stored in the system construction file 206 can be read from each module which constitutes the network device management software 1052 if needed.

The device list module 207 generates HTML documents that show the list of the devices searched by the below-mentioned device search module 208 (device list). Processing of the display option of a device list etc. is controlled by the device list module 207.

Device search module 208 searches for devices connected to networks.

Device information module 209 controls to display and/or setup more detailed information with regard to specific device specified by CGI parameters and generates a corresponding HTML documents. The device information module 209 uses the below-mentioned device inherent module 210 corresponding to the specified devices, in order to obtain and/or setup the detailed information on the specified device.

The device inherent module 210 exists for every device (a printer, network interface board, etc.) that is set as the management target of network device management software. While it is displayed, the device inherent module 210 obtains necessary information from these devices, and sets up the obtained information in template module 212. In addition, when it is set up, it converts a setup value notified of by a CGI parameter to a value that device can interpret and transmits the converted value to the device.

A protocol module 211 controls various protocols required in order that network device management software may communicate with a device, such as handling of MIB, transmission and reception of a SNMP packet, and control of a transport protocol.

A template module 212 generates HTML documents as an output result of the network device management software 1052 based on the template file 213 stored in a hard disk 21 of FIG. 1.

A Template module 212 opens template file designated by CGI parameter, main control module 203, system module 205, device list module 207 or device information module 209, and analyzes contents of the template file. Then it generates HTML documents and transmits the generated HTML documents to the WWW server program 1051 through the CGI interface 202 by replacing template variables contained in template files to the values set up by the main control module 203, the system module 205, the device list module 207, the device information module 209, or the device inherent module 210 if needed.

The value of the template variables used in generating HTML documents, or the generated HTML document files may also be stored as cache files 214 on the hard disk 21 of FIG. 1. By reading saved cache files 214, the processing time of HTML documents can be shortened when the processing is done on the basis of the same template files at the second time or later.

FIG. 3 is a flow diagram to show an example of processing to display device list in the network device management software related to the present invention.

In FIG. 3 when in step S300 a device list display request is generated, device lists such as a list of a management target device to be displayed and management data of each device are obtained, and processing goes to step S302. A device list request is transmitted to a WWW server program 1051 from a WWW browser program 1031 according to directions of a user. In addition, information stored in cache may be used as information to be displayed, when a list of these management target device and management data of each device are stored as cache in RAM 13.

In addition, when management data is not stored in cache, an appropriate device search procedure (for example, methods of carrying out global transmission of Get-request as shown in the conventional example) is employed, and management target devices connected to networks are searched for. Necessary management data is obtained from each device searched for, and the obtained data is employed for displaying, and it can also be stored as cache in RAM 13.

In step S302, the display setup item information specified according to page display for device list display setup (cf. FIG. 8) is read from RAM 13 and obtained, and then processing goes to step S303. This display setup item information includes information to show a selected management data item in 81 and 82 of FIG. 8. In addition, when a user pushed an OK button in page of FIG. 8, the information to show a selected management data item is transferred to WWW server program 1051 from WWW browser program 1031, and is stored in RAM 13.

In step S303, display setup information obtained in step S302 is examined, and is checked whether a management data item specified as sort key is selected as a management data item to be displayed in the device list. Here when it is selected as a management data item to be displayed (S303—Yes), process goes to step S305.

On the other hand, when it is not selected as the management data item to be displayed (S303—No), process goes to step S304 and a display setup item is changed. In other words, the display setting item information read from RAM 13 is changed, so that the management data item specified as a sort key may surely be the management data item displayed in the device list, and then process goes to step S305.

In continuing step S305, according to the display setup item information obtained at step S301, or the display setup item information changed at step S304, the management data of each device obtained at step S301 is converted into the display format data (for example, HTML documents) which can be displayed on a WWW browser, and pages are generated, and process goes to step S306.

And in step S306, the display format page data generated at step S304 or step S305 is outputted (when for example, display format data are HTML documents, it is outputted by standard format), and process is completed. Specifically, the generated HTML documents are passed to WWW server program 1051 from the network management software 1052, is further transmitted to WWW browser program 1031 from WWW server program 1051. And the WWW browser program 1031 analyzes the HTML documents received, and displays a screen as shown in FIG. 10 on a display based on the analysis result.

Figure 8:
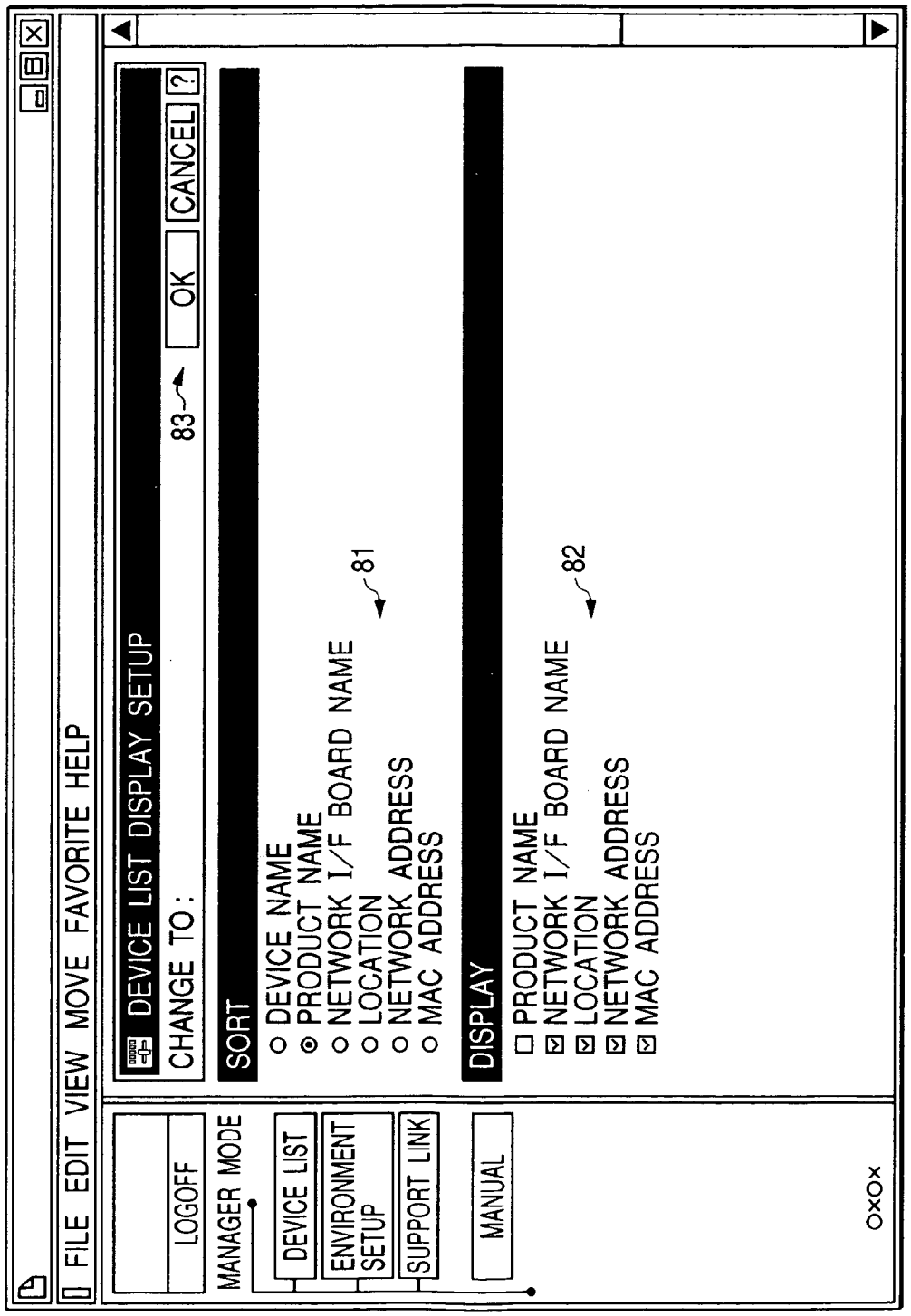
FIG. 8 is a diagram showing an example of a display of a page for carrying out a display setup of a device list.
Figure 10:
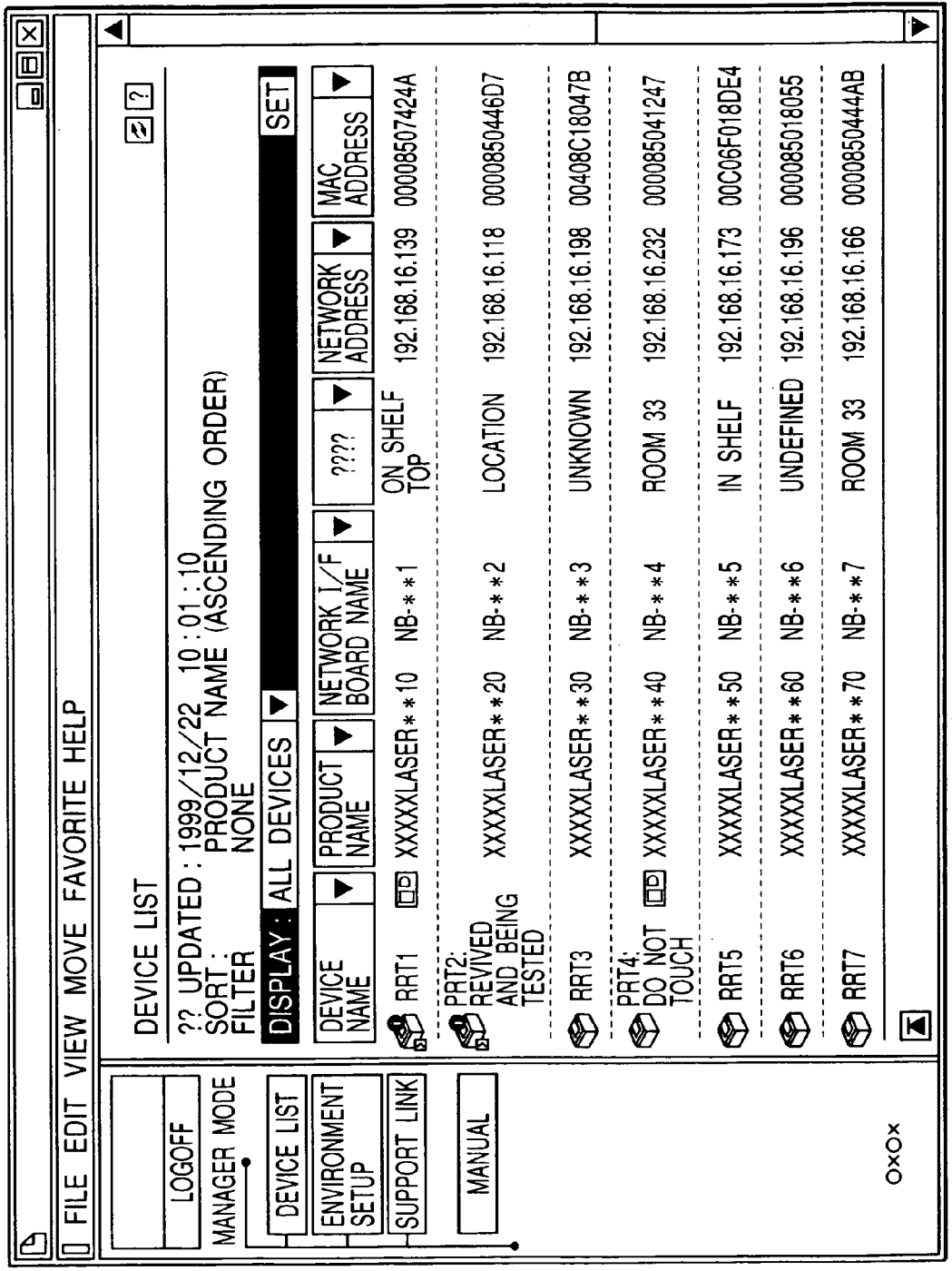
FIG. 10 is an illustration to show display an example of the device list showing a management target device connected to networks by a list.
Figure 11:
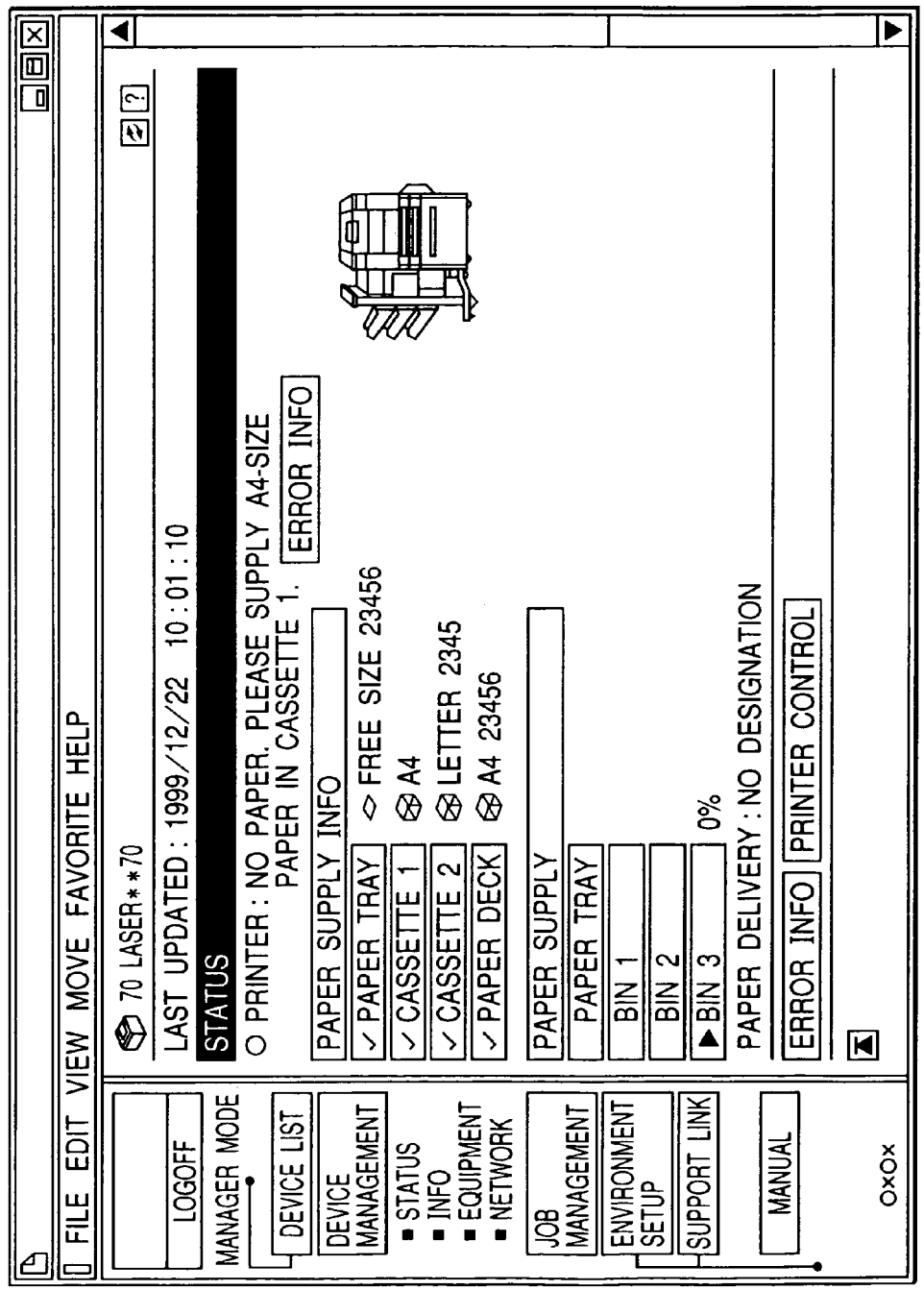
FIG. 11 is an illustration to show device details display example to display more detailed information of a device.

In FIG. 10, contents based on display setup item information that is set up in display setup page of FIG. 8 are displayed. In FIG. 8, since "product name" is chosen as management-data item used as a sort key in spite of the "product name" not being chosen as a management-data item displayed, the product name of each device is displayed, and each device is sorted in order of the product name, and arranged.

In addition, in the process shown in FIG. 3, in process (−S305) in which the display format data of a device list are generated, processing was performed so that the management data item that is the above described sort key might always be displayed. However, in the case where the display setup item information is stored, it may be stored after the display-setup item information is automatically changed so that the management data item specified as a sort key may be included in the management data item displayed.

Moreover, on a page screen shown in FIG. 8, although "product name" is specified to be a management data item which is a sort key, when the "product name" is not specified to be the management data item displayed, the device list of the network device management software concerning the present invention is as shown in FIG. 4. In addition, according to a conventional network device management software, the device list is as shown in FIG. 9.

According to the conventional network device management software, "product name" which is specified as sort key was not displayed in device list as indicated in FIG. 9. However, under control of the network device management software concerning the present invention, as shown in FIG. 4, in spite of not checking "product name" (Product Name) 46 specified as a sort key in the management data item 82 to be displayed, it turns out that it is automatically displayed on the device list together with other names and addresses 41 to 45.

In addition, in the above described embodiment the case is described where the network device management software related to the present invention is stored in ROM 12, hard disk (HD) 21 or floppy disk (FD) 22 and executed. However, the network device management software related to the present invention may be supplied by programs installed from the outside. Moreover, it may be loaded and executed in PC that the network device control software concerning the present invention can work, and that is equipped with composition equivalent to PC 150 in FIG. 1. In this case the present invention is applicable when the program is supplied by after mentioned various storage media such as CD-ROM, flash memory and floppy disk. Or the present invention can also be applicable when the program is supplied to PC by information group including programs being loaded in the PC from external storage media through network such as Internet, electronic mail or personal computer communication.

Figure 5:
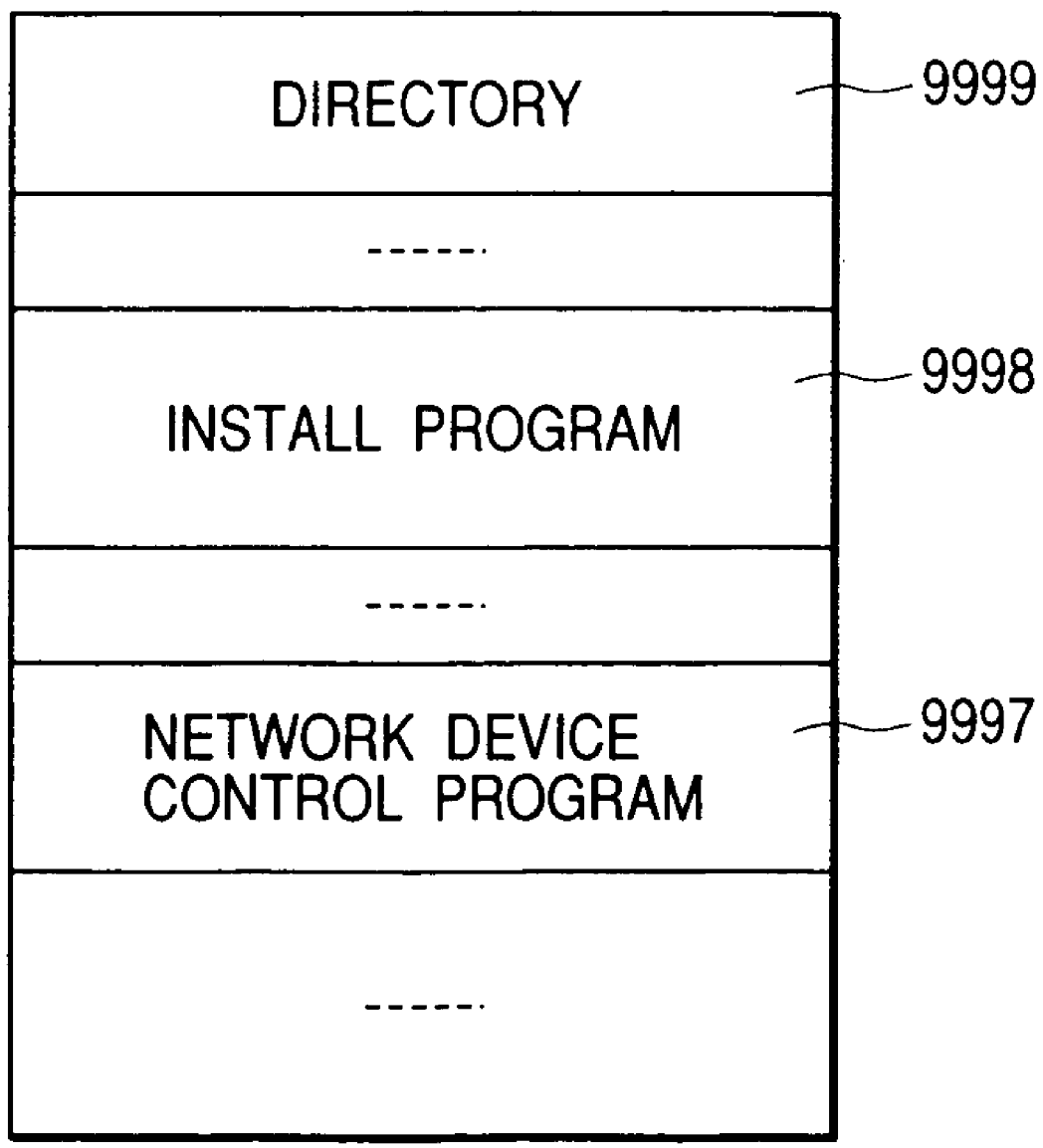
FIG. 5 is a figure of image that shows memory maps of CD-ROM that is one embodiment of storage medium according to the present invention.

FIG. 5 is a chart that shows a memory map of CD-ROM that is one embodiment of storage media related to the present invention.

Directory information area is represented by 9999 where directory information is stored. In directory information memory area 9999, memory location of installation program memory area 9998 after 9999 and of network device control software memory area 9997 are shown. In network device control software memory area 9997, network device control software is stored.

When a network device management software related to the present invention is installed in PC that is equipped with composition equivalent to PC 150 in FIG. 1, at first installation program stored in installation program memory area 9998 is loaded into system, and then it is executed by CPU 11. In the next step, a network device management software is read out by installation program executed by CPU 11 from network device control software memory area 9997, and the management software read out is stored in hard disc 21 of PC 150.

In addition, the present invention may be applied to a system or integrated devices consisting of a plurality of equipment (a host computer, interface equipment, reader, for example), and in addition, may be applied to a device consisting of one equipment.

Moreover, the present invention may not be restricted to a device list and may be applied also to a data list of data. In other words the present invention is applicable also to displaying a data of each record in a list.

It goes without saying that the purpose of this invention is also achieved by supplying to a system or equipment the storage medium on that the program code of the software realizing the function of the above described embodiment is stored, and by reading and executing program codes stored in storage media by computer (or CPU and MPU) of the system or the equipment.

In this case, the program code itself read from the storage media will realize a new function of the present invention, and the storage media which store the program code and the program code itself will constitute the present invention.

For example, floppy disk, hard disk, optical disk, magneto-optical disk, CD-ROM, CD-R, magnetic tape, nonvolatile memory card and ROM may be used as storage media to supply the program code.

Moreover, in addition that the function of the above described embodiment is achieved by executing the program code which the computer read, the OS etc. working on the computer performs a part or all of actual processing based on directions of the program code, resulting that the function of the above described embodiment may also be realized by the processing.

Furthermore, after the program code read from the storage media is written in the memory of an extension board inserted to the computer and extension unit connected to the computer, CPU etc. equipped in the extension board and the extension unit perform one part or all of actual process according to instructions of the program code, resulting that the function of the above described embodiment may also be realized by the processing.

In addition, it goes without saying that the present invention is applicable in the case where the program is delivered to a person who called for the program from the storage media that the program code of software to realize functions of an above described embodiment is recorded, over communication lines such as personal computer communication.

As explained above, according to the present invention, in the case where the device connected to the network is managed using a predetermined protocol, a management data of each device is obtained to generate a device list of management target devices, and information on a management data display item displayed on the device list respectively specified according to a predetermined display setup screen and information on a management data key item used as a sort key of the device list are obtained, and then the management data key item is controlled automatically to be certainly displayed on the sorted device list while the device list is sorted based on the specified management data key item.

Therefore, it is effective in the problem of the conventional technology may be solved, in which because a management data item specified as a sort item is not displayed in the device list because of carelessness of a user, it is not recognized based on which management-data item the device list is sorted, or the sorted result cannot be recognized.

What is claimed is:

1. A network managing method for providing a device list that includes a plurality of records, each record including a plurality of device information corresponding respectively to a plurality of items, and each of the plurality of items represents a kind of the device information included in each record, said network managing method comprising:

designating, at a management device, from among the plurality of items, at least one display-target item to be displayed on the device list, wherein, from among the plurality of device information included in each record of the device list, device information corresponding to the designated display-target items are set to be displayed while the device information corresponding to the items not designated as a display-target item are not set to be displayed in the device list, and designating any one of the plurality of items, which were not designated as a display-target item, as a sort-item, wherein, a display order of the plurality of records to be included in the device list is rearranged according to a content of the device information corresponding to the designated sort-item;

a setting step of setting the designated sort-item as a display-target item to be displayed in the device list even though the item has not been designated as a display-target item in the designating step;

a rearranging step of rearranging the records in the device list according to the content of the device information corresponding to the designated sort-item; and a display step of displaying the device list rearranged in the rearranging step, including the device information corresponding to the designated display-target items and the designated sort-item.

2. The method according to claim 1, wherein the device list is displayed on a display area of a display.

3. The method according to claim 1, further comprising:
a detection step of detecting a plurality of devices connected to a network;
a device information obtaining step of obtaining device information from the detected plurality of devices; and
a device list generation step of generating device list data representing the device list based on the obtained device information.

4. The method according to claim 3, further comprising a storing step of storing the obtained device information in a memory area, and, in the device list generation step, generating the device list data based on the device information stored in the memory area.

5. The method according to claim 3, further comprising:
a transmitting step of transmitting the generated device list data to the network; and
a display controlling step of analyzing the transmitted device list data and having a display area display the device list.

6. The method according to claim 5, wherein said device list data is data described in HTML, and in the device list transmitting step the device list data is transmitted to the network using an HTTP protocol.

7. The method according to claim 6, wherein each of the plurality of devices is a printer.

8. The method according to claim 1, wherein the plurality of items of device information comprise a device name, a device product name, a location of device installation, a device network address, and a device MAC address.

9. A method according to claim 1, further comprising a judging step of judging whether or not the designated sort-item has been designated as a display-target item.

10. A management device for providing a device list that includes a plurality of records, each record including a plurality of device information corresponding respectively to a plurality of items, and each of the plurality of items represents a kind of the device information included in each record, comprising:

a processor, a memory, designating means for designating, from among the plurality of items, at least one display-target item to be displayed on the device list, wherein, from among the plurality of device information included in each record of the device list, device information corresponding to the designated display-target items are set to be displayed while the device information corresponding to the items not designated as a display-target item are not set to be displayed in the device list, and designating any one of the plurality of items, which were not designated as a display-target item, as a sort-item, wherein, a display order of the plurality of records to be included in the device list is rearranged according to a content of the device information corresponding to the designated sort-item;

setting means for setting the designated sort-item as a display-target item to displayed in the device list even though the item has not been designated as a display-target item in the designating means;

rearranging means for rearranging records in the device list according to the content of the device information corresponding to the designated sort-item designated by said designating means; and displaying means for displaying the device list rearranged in the rearranging means, including the device information corresponding to the designated display-target items and the designated sort-item.

11. The device according to claim 10, wherein said device list is displayed in a display area of a display.

12. The device according to claim 10, further comprising:
detecting means for detecting a plurality of devices connected to a network;
device information obtaining means for obtaining device information from the detected plurality of devices; and device list generating means for generating device list data representing the device list based on the obtained device information.

13. The device according to claim 12, further comprising memory means for storing the obtained device information, wherein the device list generating means generates the device list data based on the device information stored in the memory means.

14. The device according to claim 12, further comprising transmitting means for transmitting the generated device list data to an external device, wherein the external device analyzes the transmitted device list data and has a display area display the device list.

15. The device according to claim 14, wherein the device list data is data described in HTML and the device list transmitting means transmits the device list data to the network using an HTTP protocol.

16. The device according to claim 15, wherein each of the plurality of devices is a printer.

17. The device according to claim 10, wherein the plurality of items of device information comprise a device name, a device product name, a location of device installation, a device network address, and a device MAC address.

18. The device according to claim 10, further comprising judging means for judging whether or not the designated sort-item has been designated as a display-target item.

19. A computer-readable storage medium on which is stored a computer-executable program to provide a device list that includes a plurality of records, each record including a plurality of device information corresponding respectively to a plurality of items, and each of the plurality of items represents a kind of the device information included in each record, the program, when executed, perform, the steps of:
designating, from among the plurality of items, at least one display-target item to be displayed on the device list, wherein, from among the plurality of device information included in each record of the device list, device information corresponding to the designated display-target items are set to be displayed while the device information corresponding to the items not designated as a display-target item are not set to be displayed in the device list, and designating any one of the plurality of items, which were not designated as a display-target item, as a sort-item, wherein, a display order of the plurality of records to be included in the device list is rearranged according to a content of the device information corresponding to the designated sort-item;
a setting step of setting the designated sort-item as a display-target item to be displayed in the device list even though the item has not been designated as a display-target item in the designating step;
a rearranging step of rearranging the records in the device list according to the content of the device information corresponding to the designated sort-item; and
a display step of displaying the device list rearranged in the rearranging step, including the device information corresponding to the designated display-target items and the designated sort-item.

20. The storage medium according to claim 19, wherein the program further comprises a display step having a display area display the device list.

21. The storage medium according to claim 19, wherein the program further comprises the steps of:
a detection step of detecting a plurality of devices connected to a network;
a device information obtaining step of obtaining device information from the detected plurality of devices; and
a device list generation step of generating device list data representing the device list based on the obtained device information.

22. The storage medium according to claim 19, further comprising a judging step of judging whether or not the designated sort-item has been designated as a display-target item.

23. A method of providing a data list that displays data that includes a plurality of records, each record including a plurality of data corresponding respectively to a plurality of items, and each of the plurality of items represents a kind of the data information included in each record, comprising the steps of:
designating at a management device, from among the plurality of items, at least one display-target item to be displayed on the data list, wherein, from among the plurality of data included in each record of the data list, data corresponding to the designated display-target items are set to be displayed while the data corresponding to the items not designated as a display-target item are not set to be displayed in the data list, and; designating any one of the plurality of items, which were not designated as a display-target item, as a sort-item, wherein, a display order of the plurality of records to be included in the data list is rearranged according to a content of the data corresponding to the designated sort-item;
a setting step of setting the designated sort-item as a display-target item to be displayed in the data list even though the item has not been designated as a display-target item in the designating step;
a rearranging step of rearranging the records in the data list according to the content of the data corresponding to the designated sort-item; and
a display step of displaying the data list rearranged in the rearranging step, including the data information corresponding to the designated display-target items and the designated sort-item.

24. The method according to claim 23, further comprising a display step of making a display area display the data list.

25. The method according to claim 23, further comprising a judging step of judging whether or not the designated sort-item has been designated as a display-target item.

26. A device for providing a data list that displays data that includes a plurality of records, each record including a plurality of data corresponding respectively to a plurality of items, and each of the plurality of items represents a kind of the data information included in each record, comprising:
a processor;
a memory;
designating means for designating, from among the plurality of items, at least one display-target item to be displayed on the data list, wherein, from among the plurality of data included in each record of the data list, data corresponding to the designated display-target items are set to be displayed while the data corresponding to the items not designated as a display-target item are not set to be displayed in the data list, and; designating any one of the plurality of items, which were not designated as a display-target item, as a sort-item, wherein, a display order of the plurality of records to be included in the data list is rearranged according to a content of the data corresponding to the designated sort-item;
setting means for setting the designated sort-item as a display-target item to be displayed in the data list even though the item has not been designated as a display-target item in the designating means;

rearranging means for rearranging the records in the data list according to the content of the data corresponding to the designated sort-item designated by said designating means; and display means for displaying the data list rearranged in the rearranging means, including the device information corresponding to the designated display-target items and the designated sort-item.

27. The device according to claim 26, further comprising displaying means for making a display area display the data list.

28. The device according to claim 26, further comprising a judging means for judging whether or not the designated sort-item has been designated as a display-target item.

29. A computer-readable storage medium on which is stored a computer-executable program for providing a data list that displays data that includes a plurality of records, each record including a plurality of data corresponding respectively to a plurality of items, and each of the plurality of items represents a kind of the data information included in each record, wherein said program, when executed, perform, the steps of:

designating, from among the plurality of items, at least one display-target item to be displayed on the data list, wherein, from among the plurality of data included in each record of the data list, data corresponding to the designated display-target items are set to be displayed while the data corresponding to the items not designated as a display-target item are not set to be displayed in the data list, and designating any one of the plurality of items, which were not designated as a display-target item, as a sort-item, wherein, a display order of the plurality of records to be included in the device list is rearranged according to a content of the data corresponding to the designated sort-item;

a setting step of setting the designated sort-item as a display-target item to be displayed in the data list even though the item has not been designated as a display-target item in the designating step;

a rearranging step of rearranging the records in the data list according to the content of the data corresponding to the designated sort-item; and a display step of displaying the data list rearranged in the rearranging step, including the device information corresponding to the designated display-target items and the designated sort-item.

30. The storage medium according to claim 29, wherein the program further comprises a display step of displaying the data list on a display area.

31. The storage medium according to claim 29, further comprising a judging step of judging whether or not the designated-sort item has been designated as a display-target item.

* * * * *